US012404132B2

(12) United States Patent
Wei et al.

(10) Patent No.: US 12,404,132 B2
(45) Date of Patent: Sep. 2, 2025

(54) PAPER ROLL CARRYING DEVICE

(71) Applicant: PRIMAX ELECTRONICS LTD., Taipei (TW)

(72) Inventors: Yi-Lun Wei, Taipei (TW); Wei-Ping Zeng, Taipei (TW); Wen-Lung Hung, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 132 days.

(21) Appl. No.: 18/423,347

(22) Filed: Jan. 26, 2024

(65) Prior Publication Data

US 2025/0223125 A1 Jul. 10, 2025

(30) Foreign Application Priority Data

Jan. 8, 2024 (CN) ......................... 202410026333.5

(51) Int. Cl.

| | |
|---|---|
| *B65H 16/06* | (2006.01) |
| *B41J 3/407* | (2006.01) |
| *B41J 15/02* | (2006.01) |
| *B41J 15/04* | (2006.01) |
| *B65H 19/12* | (2006.01) |

(52) U.S. Cl.
CPC ............ *B65H 16/06* (2013.01); *B41J 3/4075* (2013.01); *B41J 15/02* (2013.01); *B41J 15/042* (2013.01); *B65H 19/126* (2013.01); *B65H 2301/41346* (2013.01); *B65H 2301/41352* (2013.01)

(58) Field of Classification Search
CPC .................................................... B65H 75/185
USPC ..................... 242/596.7, 599.1, 599.2, 597.5
See application file for complete search history.

(56) References Cited

U.S. PATENT DOCUMENTS

| | | | | |
|---|---|---|---|---|
| 6,431,492 B1 * | 8/2002 | Chillscyzn | B41J 15/042 | 242/615 |
| 6,609,844 B1 * | 8/2003 | Petteruti | B41J 3/36 | 400/613 |
| 8,925,854 B2 * | 1/2015 | Chen | B65H 16/06 | 242/578.1 |
| 11,332,334 B2 * | 5/2022 | Ji | B65H 16/06 | |
| 2001/0054667 A1 * | 12/2001 | Komatsu | B65H 75/08 | 242/596.7 |
| 2010/0061790 A1 * | 3/2010 | Yu | B41J 11/0025 | 400/613 |
| 2015/0150422 A1 * | 6/2015 | Ochoa, Sr. | A47K 10/16 | 242/596.7 |
| 2019/0135000 A1 * | 5/2019 | Harris | B41J 15/042 | |
| 2020/0147984 A1 * | 5/2020 | Weeks | B41J 15/042 | |
| 2020/0239260 A1 * | 7/2020 | Tanizaki | B65H 16/06 | |

(Continued)

*Primary Examiner* — William A. Rivera
(74) *Attorney, Agent, or Firm* — WPAT, PC

(57) ABSTRACT

A paper roll carrying device is equipped with movable-type paper clamping arms for clamping paper rolls with different widths. The paper roll carrying device includes two paper clamping arms and two supporting mechanisms. The supporting mechanisms are respectively installed on the corresponding paper clamping arms. Each supporting mechanism includes a first support member, a second support member and a third support member. The supporting mechanism is specially designed to have the take-out slant surfaces on the supporting members. The supporting mechanism can be used to support paper cores with different diameters. When the user intends to remove the paper roll, it is not necessary to release the paper clamping arms.

12 Claims, 10 Drawing Sheets

(56) References Cited

U.S. PATENT DOCUMENTS

| | | | | |
|---|---|---|---|---|
| 2020/0307949 | A1* | 10/2020 | Sulik | B65H 16/005 |
| 2025/0170840 | A1* | 5/2025 | Liao | B41J 15/02 |

* cited by examiner

PAPER ROLL CARRYING DEVICE

FIELD OF THE INVENTION

The present invention relates to a paper carrying device for a printing system, and more particularly to a paper roll carrying device.

BACKGROUND OF THE INVENTION

As known, thermal printers or thermal copiers use thermal paper rolls as printing media. Due to their small sizes and fast printing characteristics, thermal printers or thermal copiers have been widely used in supermarkets, shopping malls, telecommunications, hospitals and other fields in order to print item details and related charges of goods or medicines for customers or patients.

Most commercially available thermal printers or thermal copiers support paper rolls with the inner diameter of 0.5 to 1 inch. In order to use paper rolls with the inner diameter of at least 1.5 inches, the user has to install additional parts on the paper core. With the assistance of the additional parts, the paper roll can be placed into the thermal printer or the thermal copier for use.

In order to overcome the drawbacks of the conventional technologies, it is important to provide a paper roll carrying device capable of supporting paper rolls with different inner diameters.

SUMMARY OF THE INVENTION

An object of the present invention provides a paper roll carrying device, especially a paper roll carrying device applied to a thermal printer or a thermal label machine. The paper roll carrying device can be used to clamp paper rolls with different widths and support paper cores with different diameters.

In accordance with an aspect of the present invention, a paper roll carrying device is provided. The paper roll carrying device includes two paper clamping arms, two supporting mechanisms and two elastic modules. The two paper clamping arms are opposed to each other. A paper roll is clamped by the two paper clamping arms. The paper roll has a paper core. The two supporting mechanisms are respectively installed on corresponding positions of the two paper clamping arms and arranged at a same side of the two paper clamping arms. The paper core is supported by the two supporting mechanisms. Each of the two supporting mechanisms includes a first support member, a second support member and a third support member. The first support member includes a first arc-shaped support part and a first stopping part. The second support member includes a second arc-shaped support part and a second stopping part. The second arc-shaped support part is located beside and arranged around the first arc-shaped support part. The first stopping part and the second stopping part are contacted with each other. The third support member includes a third arc-shaped support part and a third stopping part. The third arc-shaped support part is located beside and arranged around the second arc-shaped support part. The second stopping part and the third stopping part are contacted with each other. The two elastic modules are respectively disposed within the two paper clamping arms to provide elastic forces to the corresponding supporting mechanisms. While the first arc-shaped support part in one of the two supporting mechanisms is pushed, the corresponding second stopping part is pressed by the corresponding first stopping part, and the corresponding third stopping part is pressed by the corresponding second stopping part. Consequently, the corresponding first arc-shaped support part, the corresponding second arc-shaped support part and the corresponding third arc-shaped support part are simultaneously retracted into the corresponding paper clamping arm.

Preferably, in each of the two supporting mechanisms, the first arc-shaped support part has a first take-out slant surface, the second arc-shaped support part has a second take-out slant surface, and the third arc-shaped support part has a third take-out slant surface.

In an embodiment, when the first arc-shaped support parts of the two supporting mechanisms are inserted into a tube of the paper core and contacted with an inner wall of the tube of the paper core, the second arc-shaped support parts are respectively pushed by two ends of the paper core, and the third stopping parts are pressed by the corresponding second stopping parts. Consequently, the second arc-shaped support parts and the third arc-shaped support parts are simultaneously retracted into the corresponding paper clamping arms, and the third arc-shaped support parts and the paper roll are not interfered with each other.

In an embodiment, while the paper roll is removed, the two ends of the paper core are moved along the corresponding first take-out slant surfaces to push the corresponding first arc-shaped support parts. Consequently, the first arc-shaped support parts, the second arc-shaped support parts and the third arc-shaped support parts are simultaneously retracted into the corresponding paper clamping arms.

In an embodiment, when the first arc-shaped support parts and the second arc-shaped support parts of the two supporting mechanisms are inserted into a tube of the paper core, the second arc-shaped support parts are contacted with an inner wall of the tube of the paper core, and the third arc-shaped support parts are respectively pushed by the two ends of the paper core. Consequently, the third arc-shaped support parts are retracted into the corresponding paper clamping arms.

In an embodiment, while the paper roll is removed, the two ends of the paper core are moved along the first take-out slant surfaces and the second take-out slant surfaces to push the corresponding first arc-shaped support parts and the corresponding second arc-shaped support parts. Consequently, the first arc-shaped support parts, the second arc-shaped support parts and the third arc-shaped support parts are simultaneously retracted into the corresponding paper clamping arms.

In an embodiment, when the first arc-shaped support parts, the second arc-shaped support parts and the third arc-shaped support parts of the two supporting mechanisms are inserted into a tube of the paper core, the third arc-shaped support parts are contacted with an inner wall of the tube of the paper core.

In an embodiment, while the paper roll is removed, the two ends of the paper core are moved along the first take-out slant surfaces, the second take-out slant surfaces and the corresponding third take-out slant surfaces to push the corresponding first arc-shaped support parts, the corresponding second arc-shaped support parts and the corresponding third arc-shaped support parts. Consequently, the first arc-shaped support parts, the second arc-shaped support parts and the corresponding third arc-shaped support parts are simultaneously retracted into the corresponding paper clamping arms.

In an embodiment, each of the two elastic modules includes a first elastic element, a second elastic element and a third elastic element. In each of the two supporting mechanisms, the first arc-shaped support part, the second arc-shaped support part and the third arc-shaped support part are respectively located at first ends of the first support member, the second support member and the third support member, and the first elastic element, the second elastic element and the third elastic element are respectively contacted with second ends of the first support member, the second support member and the third support member. The first ends and the corresponding second ends are opposed to each other.

In an embodiment, the paper roll carrying device further includes a base housing, the base housing includes a paper roll accommodation space, and the two paper clamping arms are disposed within the paper roll accommodation space.

In an embodiment, at least one sliding recess is formed in a bottom side of the paper roll accommodation space, and at least one of the two paper clamping arms includes at least one sliding block. The at least one sliding block is slidably embedded within the at least one sliding recess. Consequently, one of the two paper clamping arms is movable in a direction facing the other paper clamping arm.

In an embodiment, the at least one sliding block is temporarily fixed in the at least one sliding recess, so that a width of the paper roll clamped by the two paper clamping arms is changeable.

From the above descriptions, the present invention provides a paper roll carrying device for a thermal printer or a thermal label machine. The paper roll carrying device is equipped with movable-type paper clamping arms for clamping paper rolls with different widths. Furthermore, the supporting mechanism comprises a first support member, a second support member and a third support member. The supporting mechanism can be used to support paper cores with different diameters of about 0.5 inch to 1.5 inch. When the user intends to place the paper roll and install the paper roll, it is not necessary to install additional accessories on the paper roll. The supporting mechanism is specially designed to have the take-out slant surfaces. The take-out slant surfaces are helpful for removing the paper roll. When the user intends to remove the paper roll, the user can quickly and conveniently replace the paper roll without the need of releasing the left paper clamping arm and the right paper clamping arm.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
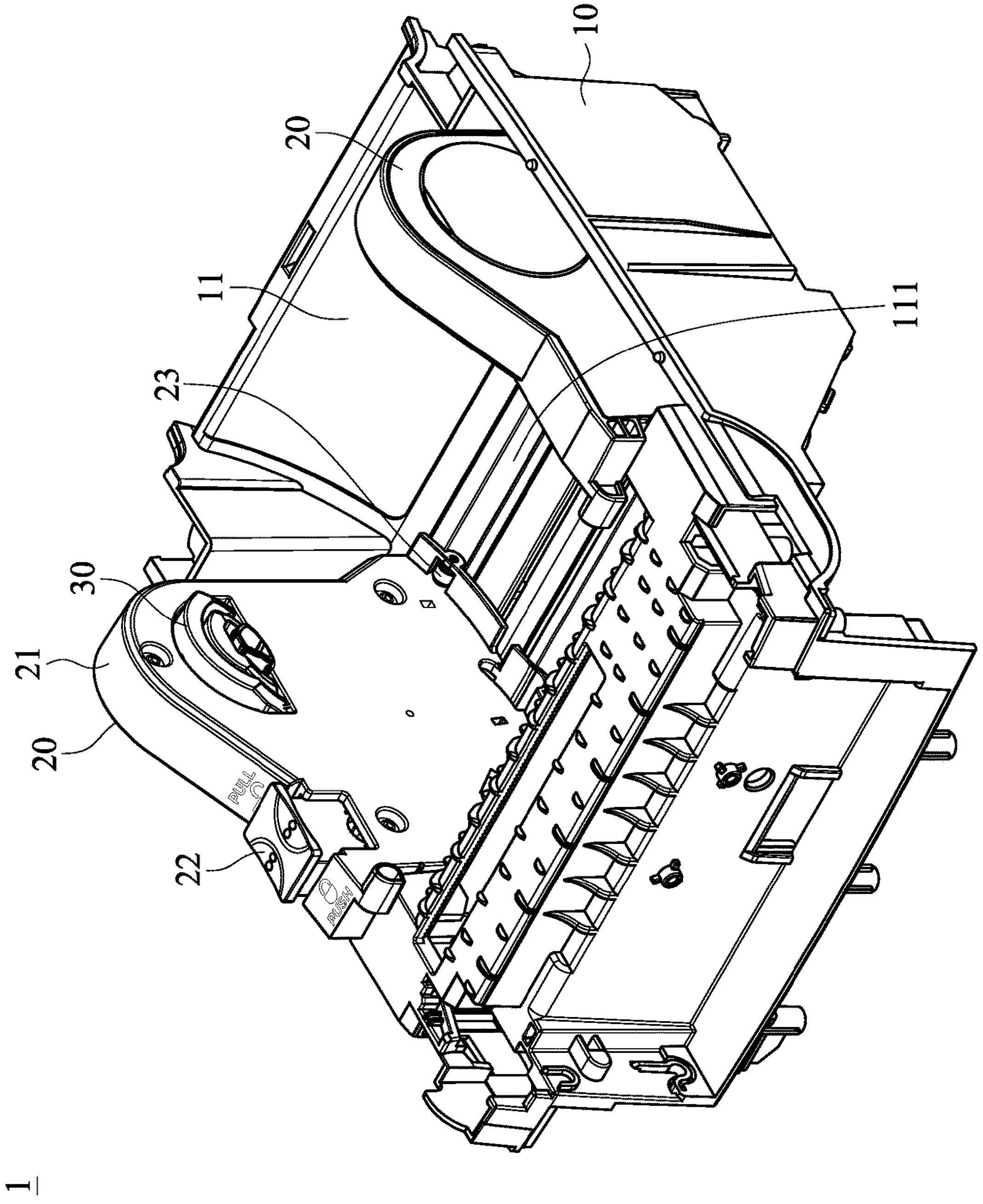
FIG. 1 is a schematic perspective view illustrating the structure of a paper roll carrying device according to an embodiment of the present invention.

FIG. 1 is a schematic perspective view illustrating the structure of a paper roll carrying device according to an embodiment of the present invention. As shown in FIG. 1, the paper roll carrying device 1 comprises a base housing 10, two paper clamping arms 20 and two supporting mechanisms 30. The paper roll carrying device 1 can be applied to a thermal printer or a thermal label machine.

The base housing 10 comprises a paper roll accommodation space 11. A sliding recess 111 is formed in the bottom side of the paper roll accommodation space 11. The two paper clamping arms 20 are opposed to each other and disposed within the paper roll accommodation space 11. In an embodiment, one of the two paper clamping arms 20 comprises a clamping housing 21, a position-limiting switch 22 and a sliding block 23. The sliding block 23 is slidably embedded within the sliding recess 111. Consequently, the paper clamping arm 20 is movable in the direction facing the other paper clamping arm 20. Moreover, the sliding block 23 can be temporarily fixed in the sliding recess 111 by the position-limiting switch 22 through a position-limiting mechanism (not shown) of the clamping housing 21. Consequently, the paper rolls with different widths can be clamped by the two paper clamping arms 20.

In an embodiment, the paper clamping arm 20 in the left side is a movable-type paper clamping arm with the position-limiting switch 22 and the sliding block 23, and the paper clamping arm 20 is a fixed-type paper clamping arm. It is noted that numerous modifications and alterations may be made while retaining the teachings of the invention. For example, in a variant example, the paper clamping arm 20 in the right side is movable-type paper clamping arm, and the paper clamping arm 20 in the left side is a fixed-type paper clamping arm. In another variant example, the paper clamping arm 20 in the right side and the paper clamping arm 20 in the left side are movable-type paper clamping arms.

The two supporting mechanisms 30 are respectively installed on the corresponding positions of the two paper clamping arms 20 and arranged at the same side of the two paper clamping arms 20. The two supporting mechanisms 30 are used for supporting a paper core (not shown).

Figure 2A:
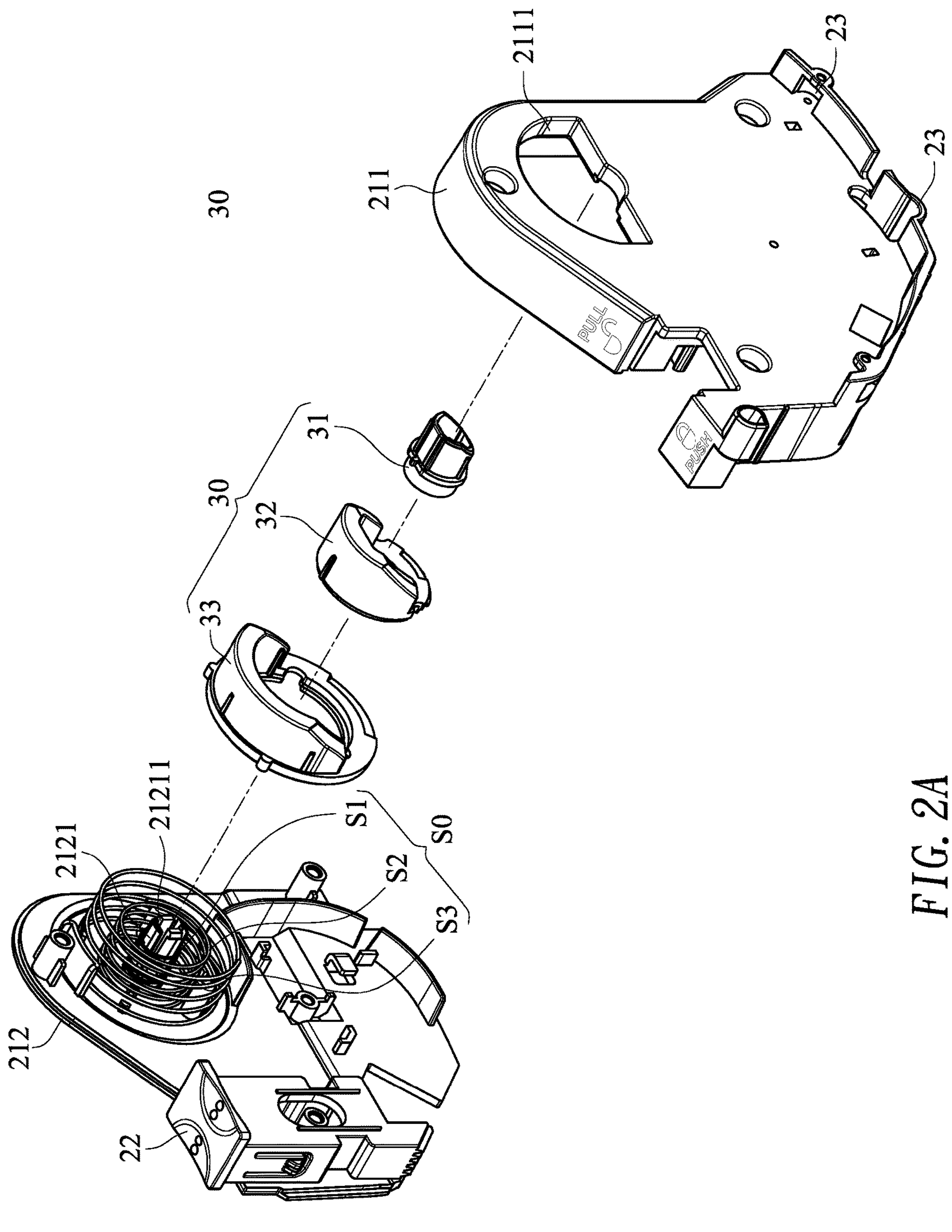
FIG. 2A is a schematic perspective and exploded view illustrating a portion of the paper roll carrying device according to the embodiment of the present invention.
Figure 2B:
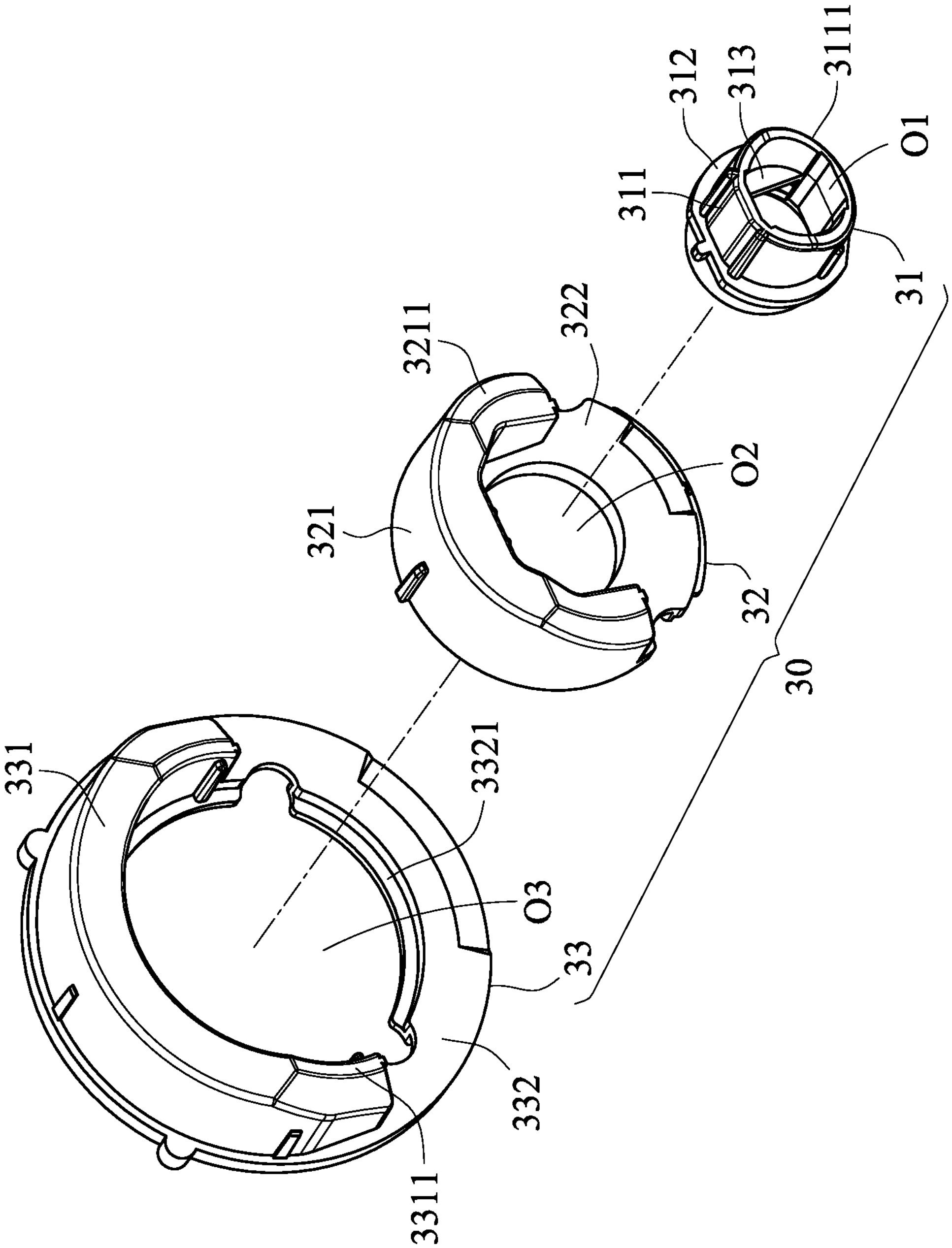
FIG. 2B is a schematic perspective and exploded view illustrating a supporting mechanism of the paper roll carrying device according to the embodiment of the present invention and taken along a viewpoint.
Figure 2C:
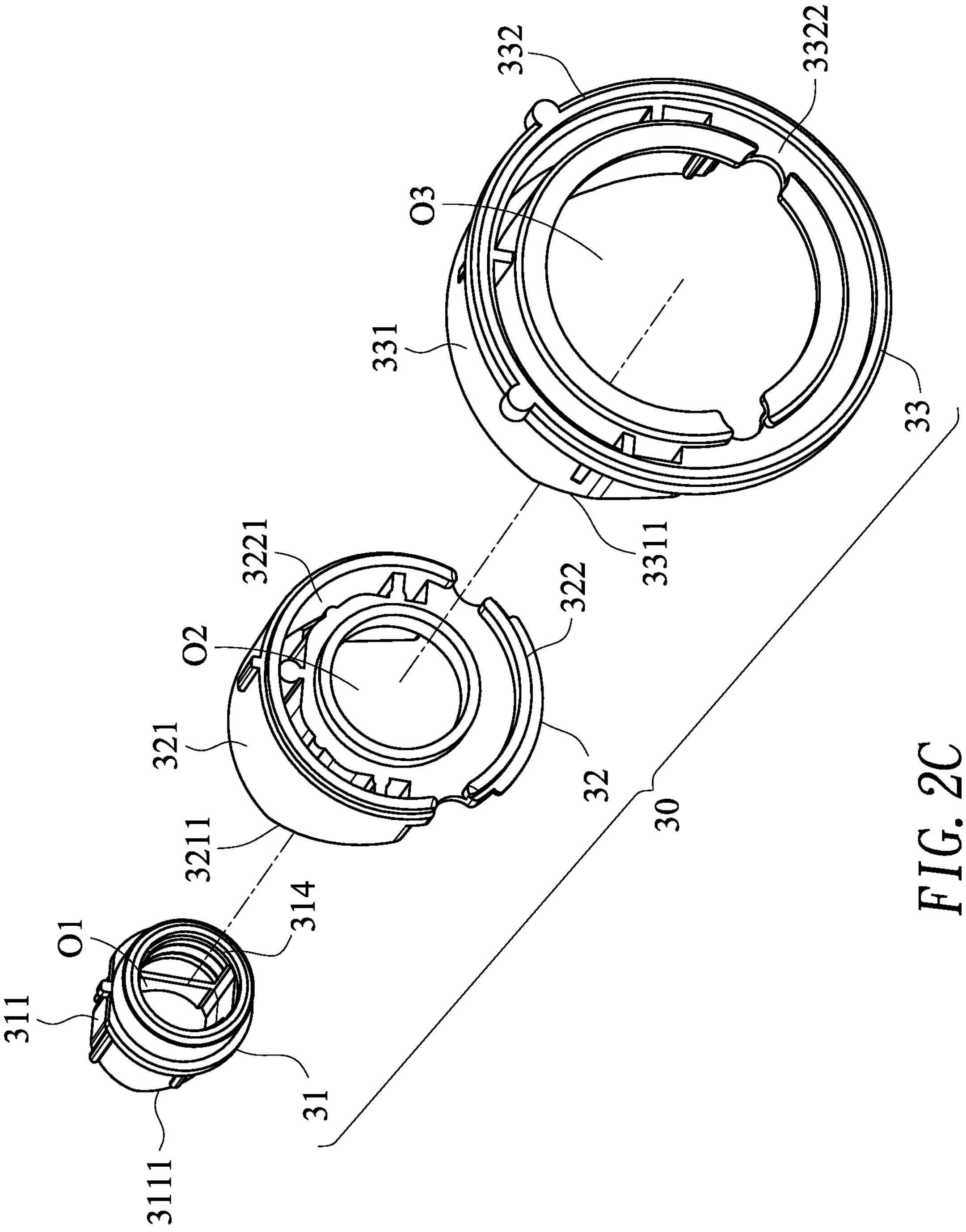
FIG. 2C is a schematic perspective and exploded view illustrating a supporting mechanism of the paper roll carrying device according to the embodiment of the present invention and taken along another viewpoint.

Please refer to FIGS. 2A, 2B and 2C. FIG. 2A is a schematic perspective and exploded view illustrating a portion of the paper roll carrying device according to the embodiment of the present invention. FIG. 2B is a schematic perspective and exploded view illustrating a supporting mechanism of the paper roll carrying device according to the embodiment of the present invention and taken along a viewpoint. FIG. 2C is a schematic perspective and exploded view illustrating a supporting mechanism of the paper roll carrying device according to the embodiment of the present invention and taken along another viewpoint.

The clamping housing 21 comprises a first covering member 211 and a second covering member 212, which are combined with each other. The first covering member 211 has a mounting hole 2111. The second covering member 212 comprises a shaft part 2121. The shaft part 2121 is installed on an inner surface of the second covering member 212 corresponding to the mounting hole 2111. An engaging rib 21211 is formed on an end of the shaft part 2121 away from the inner surface of the second covering member 212. The mounting hole 2111 and the shaft part 2121 are used to install the supporting mechanism 30.

The supporting mechanism 30 comprises a first support member 31, a second support member 32 and a third support member 33. The third support member 33, the second support member 32 and the first support member 31 are sequentially installed on the shaft part 2121 and partially penetrated through the mounting hole 2111. The paper roll carrying device 1 is additionally equipped with two elastic modules S0. Each elastic module S0 is arranged between the corresponding supporting mechanism 30 and the inner surface of the corresponding second covering member 212. In an embodiment, the elastic module S0 comprises a first elastic element S1, a second elastic element S2 and a third elastic element S3. The first elastic element S1, the second elastic element S2 and the third elastic element S3 can provide elastic forces to the first support member 31, the second support member 32 and the third support member 33, respectively. In an embodiment, the first elastic element S1, the second elastic element S2 and the third elastic element S3 are compression springs with different diameters. In addition, the first elastic element S1, the second elastic element S2 and the third elastic element S3 are arranged around the center of the shaft part 2121 in sequence from the inside to the outside.

Please refer to FIGS. 2B and 2C. The first support member 31 comprises a first arc-shaped support part 311, a first stopping part 312 and a first opening O1. The lower end of the first arc-shaped support part 311 has a first take-out slant surface 3111. The first stopping part 312 is circumferentially disposed on the outer surface of the first support member 31. The first opening O1 runs through the first support member 31. An engaging part 313 corresponding to the engaging rib 21211 of the shaft part 2121 is formed on the inner surface of the first opening O1. The first support member 31 further comprises a first positioning recess 314. The first positioning recess 314 is located at an end of the first support member 31 opposed to the first arc-shaped support part 311.

The second support member 32 comprises a second arc-shaped support part 321, a second stopping part 322 and a second opening O2. The lower end of the second arc-shaped support part 321 has a second take-out slant surface 3211. The second opening O2 is located over the second stopping part 322. The second stopping part 322 further comprises a second positioning recess 3221. The second positioning recess 3221 is located at an end of the second stopping part 322 opposed to the second arc-shaped support part 321.

The third support member 33 comprises a third arc-shaped support part 331, a third stopping part 332 and a third opening O3. The lower end of the third arc-shaped support part 331 has a third take-out slant surface 3311. The third opening O3 is located over the third stopping part 332. In this embodiment, the third stopping part 332 and the third arc-shaped support part 331 are located at the same side of the third support member 33. The third stopping part 332 comprises a receiving recess 3321. The receiving recess 3321 is formed in an inner periphery of the third opening O3 to accommodate the second stopping part 322 of the second support member 32. The third stopping part 332 further comprises a third positioning recess 3321. The third positioning recess 3321 is located at an end of the third stopping part 332 opposed to the third arc-shaped support part 331.

Figure 3:
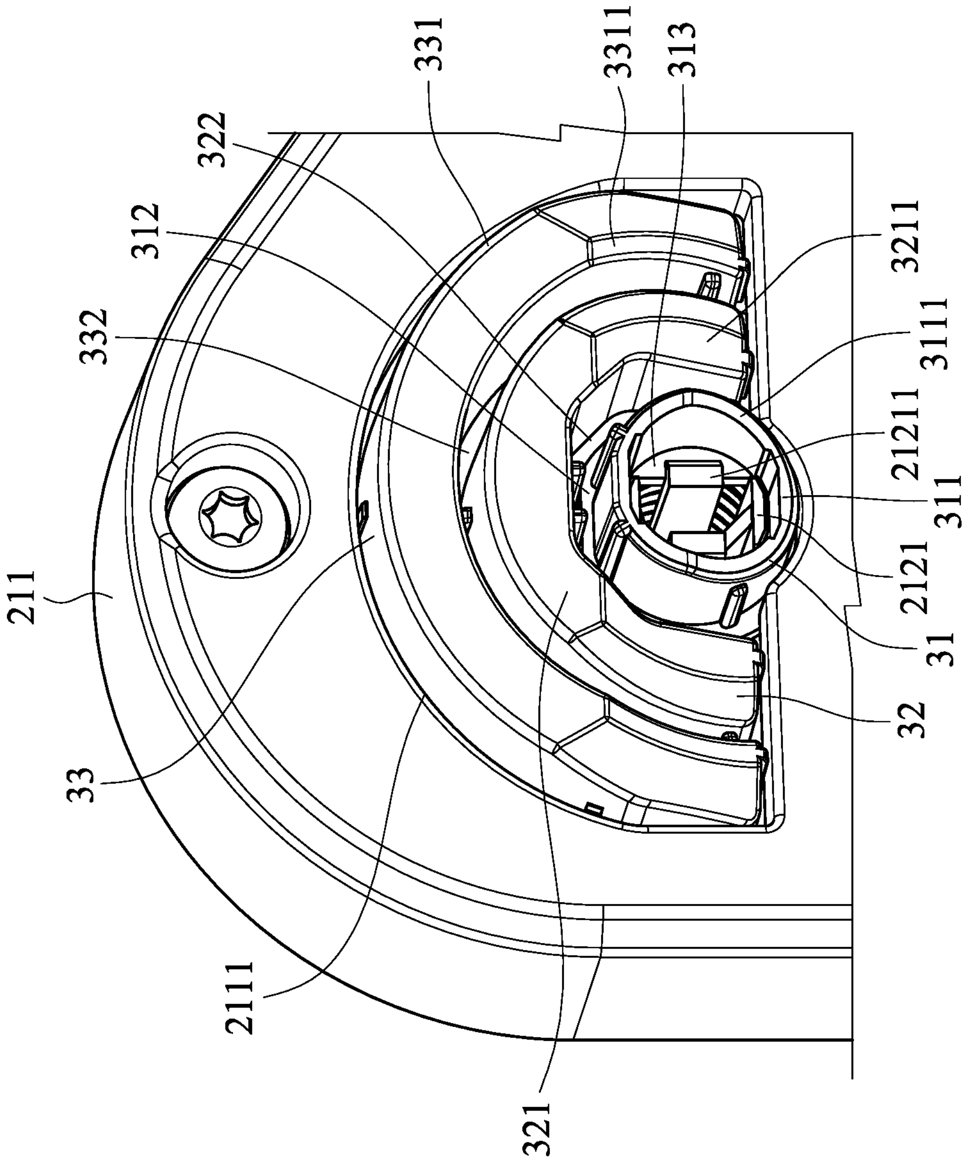
FIG. 3 is a schematic perspective view illustrating the supporting mechanism of the paper roll carrying device according to the embodiment of the present invention.
Figure 4:
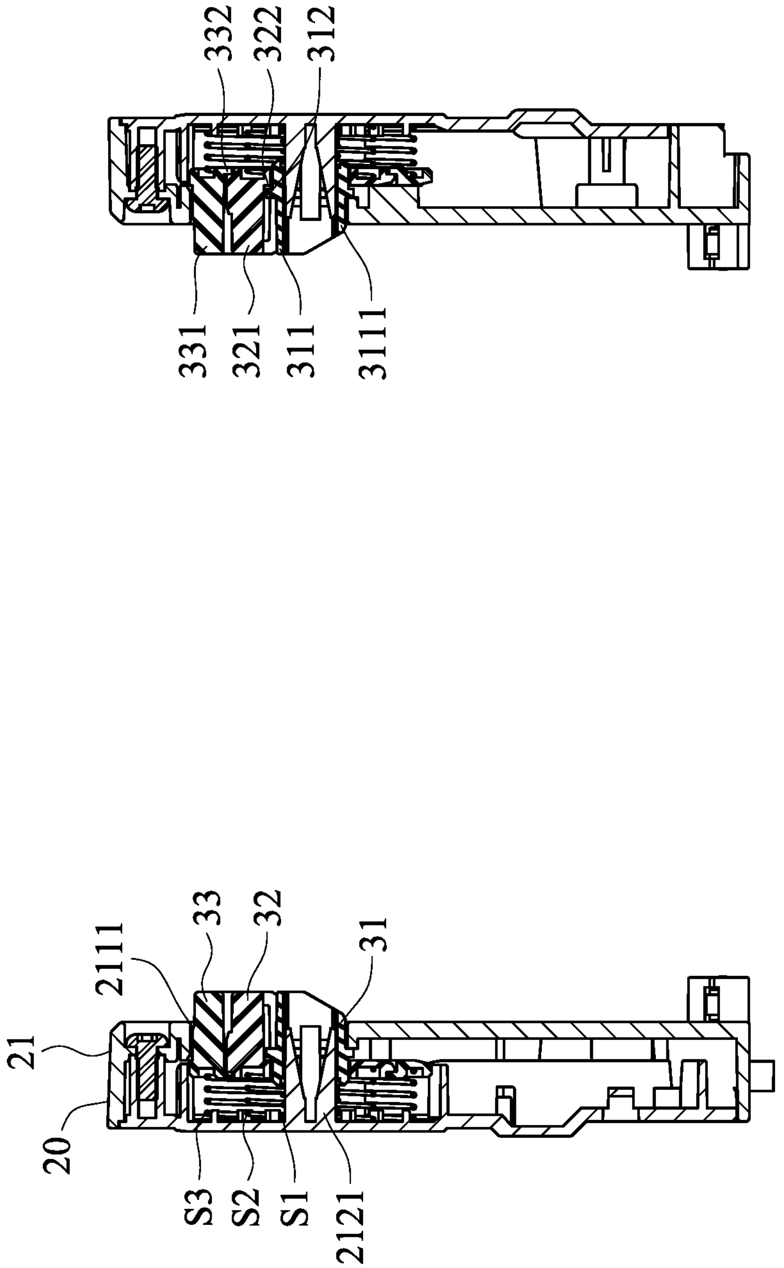
FIG. 4 is a schematic cross-sectional view illustrating a portion of the paper roll carrying device according to the embodiment of the present invention.

FIG. 3 is a schematic perspective view illustrating the supporting mechanism of the paper roll carrying device according to the embodiment of the present invention. FIG. 4 is a schematic cross-sectional view illustrating a portion of the paper roll carrying device according to the embodiment of the present invention. Hereinafter, a process of assembling the supporting mechanism 30 will be described with reference to FIGS. 2A, 2B, 2C, 3 and 4.

Firstly, the second stopping part 322 of the second support member 32 is placed into the receiving recess 3321 of the third stopping part 332. Consequently, the second stopping part 322 of the second support member 32 and the third stopping part 332 of the third support member 33 are contacted with each other and interfered with each other. Then, the end of the first support member 31 away from the first arc-shaped support part 311 (i.e., the second end of the first support member 31) is penetrated through the second opening O2 of the second support member 32. Consequently, the first stopping part 312 of the first support member 31 and the second stopping part 322 of the second support member 32 are contacted with each other and interfered with each other.

Then, the engaging rib 21211 of the shaft part 2121 is pushed into the first opening O1, and the engaging rib 21211 of the shaft part 2121 and the engaging part 313 in the first opening O1 are engaged with each other. Consequently, the first support member 31 is stalled on the shaft part 2121 of the second covering member 212. Furthermore, the first positioning recess 314 of the first support member 31, the second positioning recess 3221 of the second support member 32 and the third positioning recess 3321 of the third support member 33 are respectively connected with the ends of the first elastic element S1, the second elastic element S2 and the third elastic element S3 of the elastic module S0 away from the second covering member 212.

Please refer to FIG. 3. After the assembling process of the supporting mechanism 30 is completed, the first arc-shaped support part 311, the second arc-shaped support part 321 and the third arc-shaped support part 331 are partially penetrated through the mounting hole 2111 of the first covering member 211. Under this circumstance, the second arc-shaped support part 321 is located beside and arranged around the first arc-shaped support part 311. The third arc-shaped support part 331 is located beside and arranged around the second arc-shaped support part 321. In addition, the first take-out slant surface 3111 is located at the lower edge of the first arc-shaped support part 311, the second take-out slant surface 3211 is located at the lower edge of the second arc-shaped support part 321, and the third take-out slant surface 3311 is located at the lower edge of the third arc-shaped support part 331.

As shown in FIG. 4, the first positioning recess 314 of the first support member 31, the second positioning recess 3221 of the second support member 32 and the third positioning recess 3321 of the third support member 33 (see FIG. 2C)

are respectively connected with the ends of the first elastic element S1, the second elastic element S2 and the third elastic element S3 of the elastic module S0. Since the first elastic element S1, the second elastic element S2 and the third elastic element S3 are respectively contacted with the ends of the first support member 31, the second support member 32 and the third support member 33 opposed to the first arc-shaped support part 311, the second arc-shaped support part 321 and the third arc-shaped support part 331, the first elastic element S1, the second elastic element S2 and the third elastic element S3 can provide elastic forces to the first support member 31, the second support member 32 and the third support member 33. In case that the first arc-shaped support part 311, the second arc-shaped support part 321 and the third arc-shaped support part 331 are not pushed, the first arc-shaped support part 311, the second arc-shaped support part 321 and the third arc-shaped support part 331 can be normally penetrated through the mounting hole 2111 of the first covering member 211.

Figure 5A:
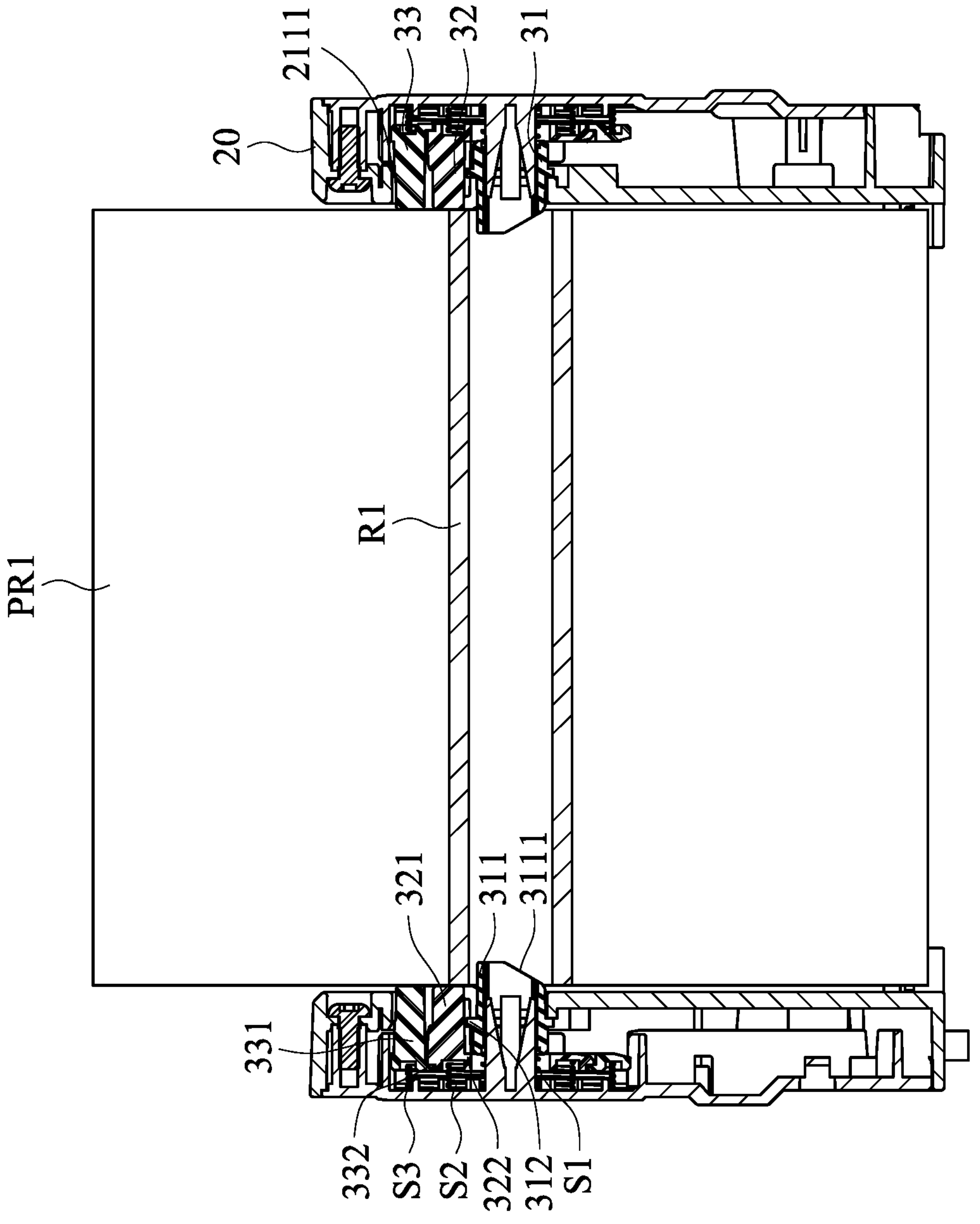
FIGS. 5A, 5B and 5C are schematic cross-sectional views illustrating the operations of the supporting mechanism of the paper roll carrying device according to the embodiment of the present invention.
Figure 5B:
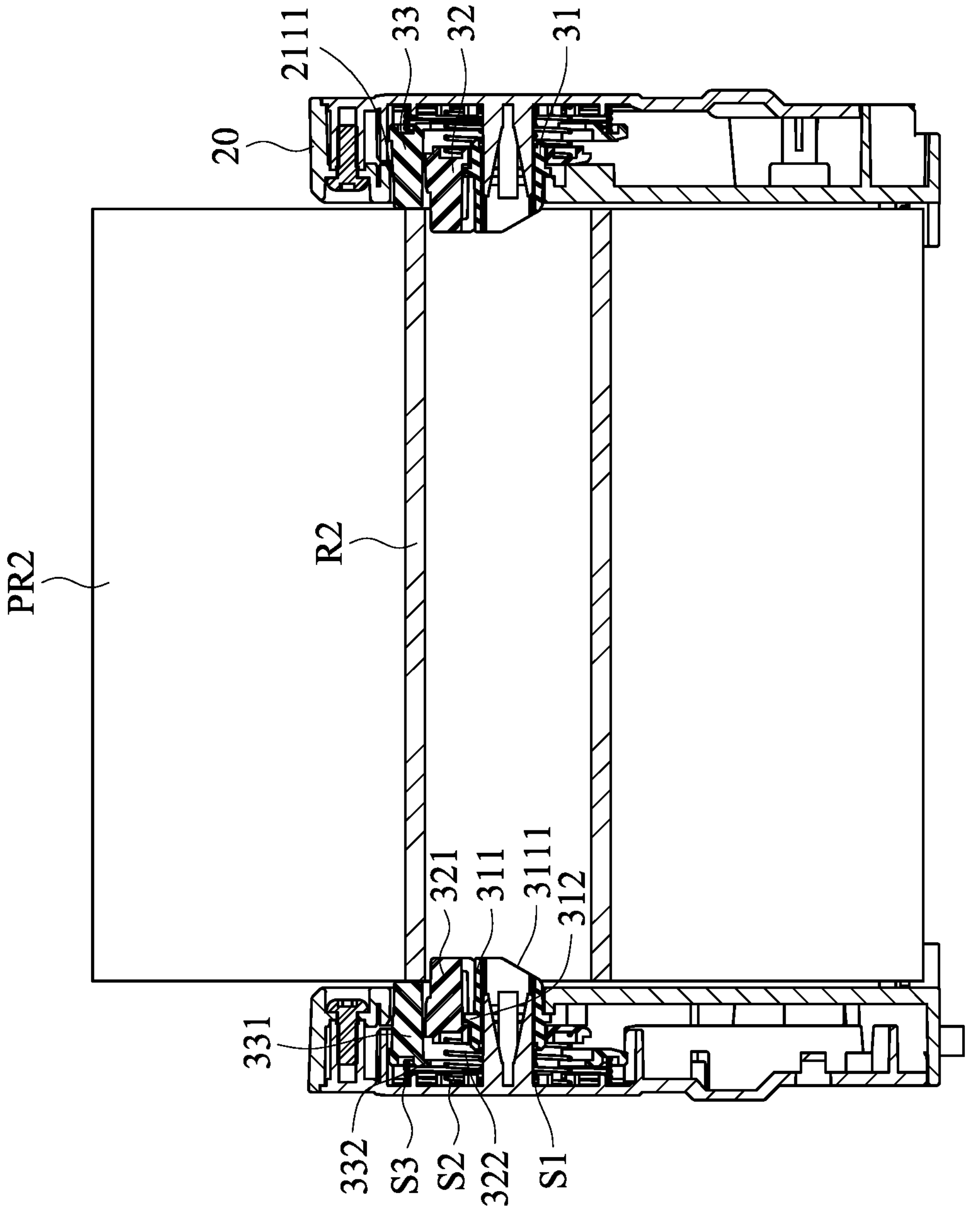
Figure 5C:
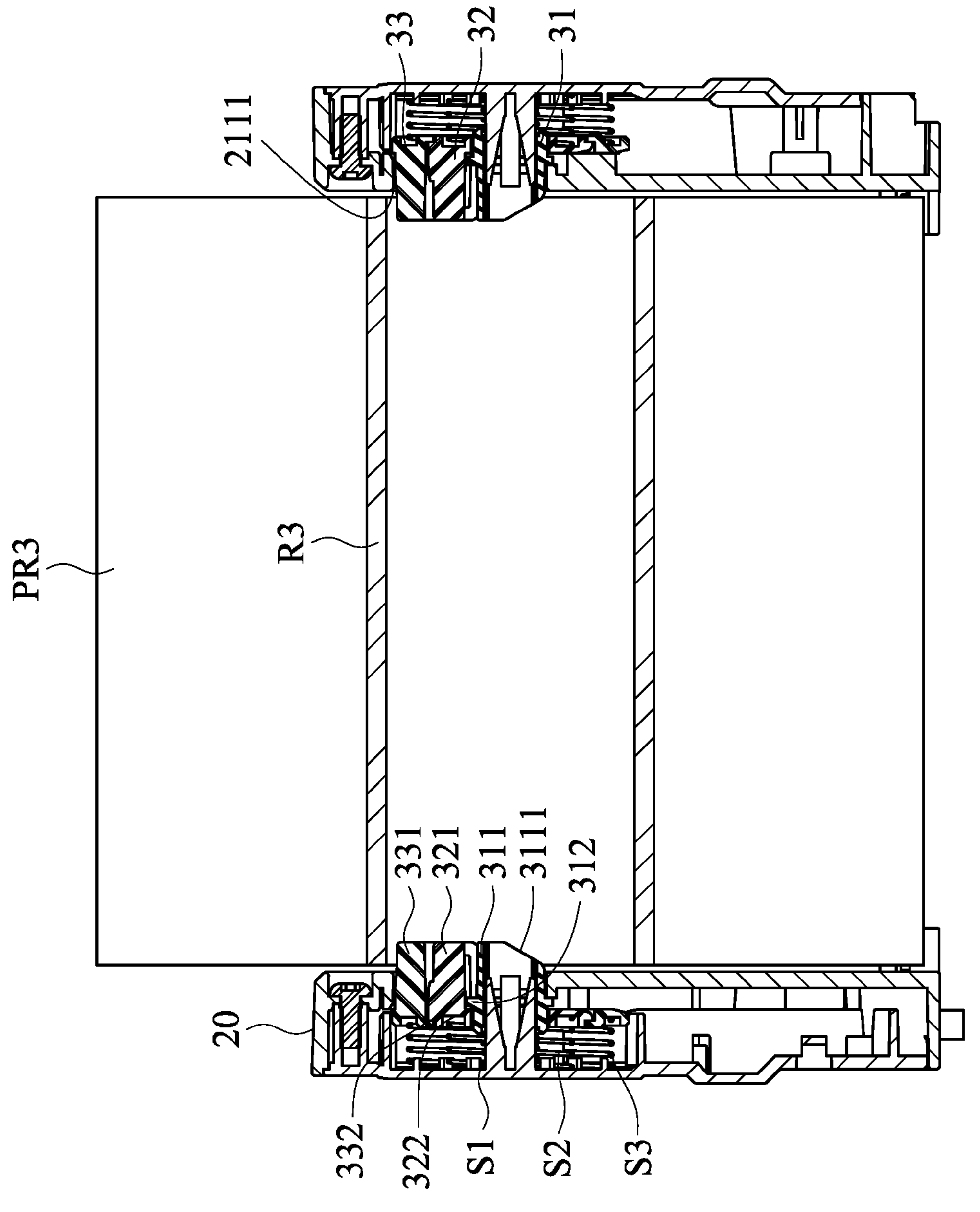

Please refer to FIGS. 5A, 5B and 5C. FIGS. 5A, 5B and 5C are schematic cross-sectional views illustrating the operations of the supporting mechanism of the paper roll carrying device according to the embodiment of the present invention.

As shown in FIG. 5A, a paper roll PR1 has a paper core R1, and the inner diameter of the tube of the paper core R1 is about 0.5 inch. While the paper roll PR1 is placed into the region between the two paper clamping arms 20, the first elastic element S1 provides the elastic force to the first support member 31. After the elastic force is released, the first arc-shaped support part 311 is inserted into the tube of the paper core R1 and contacted with the inner wall of the tube of the paper core R1 in order to support the paper core R1. In addition, the second arc-shaped support parts 321 of the two supporting mechanisms 30 are respectively pushed by the two ends of the paper core R1. In each supporting mechanism 30, the third stopping part 332 is pressed by the second stopping part 322. Consequently, the second arc-shaped support part 321 and the third arc-shaped support part 331 are simultaneously retracted into the paper clamping arm 20. In this way, the third arc-shaped support part 331 and the paper roll PR1 will not be interfered with each other.

As shown in FIG. 5B, a paper roll PR2 has a paper core R2, and the inner diameter of the tube of the paper core R2 is about 1 inch. When the paper roll PR2 is placed into the region between the two paper clamping arms 20, the first elastic element S1 and the second elastic element S2 provide the elastic forces to the first support member 31 and the second support member 32, respectively. After the elastic forces are released, the first arc-shaped support part 311 and the second arc-shaped support part 321 are inserted into the tube of the paper core R2 and contacted with the inner wall of the tube of the paper core R2 in order to support the paper core R2. In addition, the third arc-shaped support parts 331 of the two supporting mechanisms 30 are respectively pushed by the two ends of the paper core R2. Consequently, in each supporting mechanism 30, the third arc-shaped support part 331 is retracted into the paper clamping arm 20.

As shown in FIG. 5C, a paper roll PR3 has a paper core R3, and the inner diameter of the tube of the paper core R3 is about 1.5 inch. When the paper roll PR3 is placed into the region between the two paper clamping arms 20, the first elastic element S1, the second elastic element S2 and the third elastic element S3 provide the elastic forces to the first support member 31, the second support member 32 and the third support member 33, respectively. After the elastic forces are released, the first arc-shaped support part 311, the second arc-shaped support part 321 and the third arc-shaped support part 331 are inserted into the tube of the paper core R3 and contacted with the inner wall of the tube of the paper core R3 in order to support the paper core R3.

Figure 6:
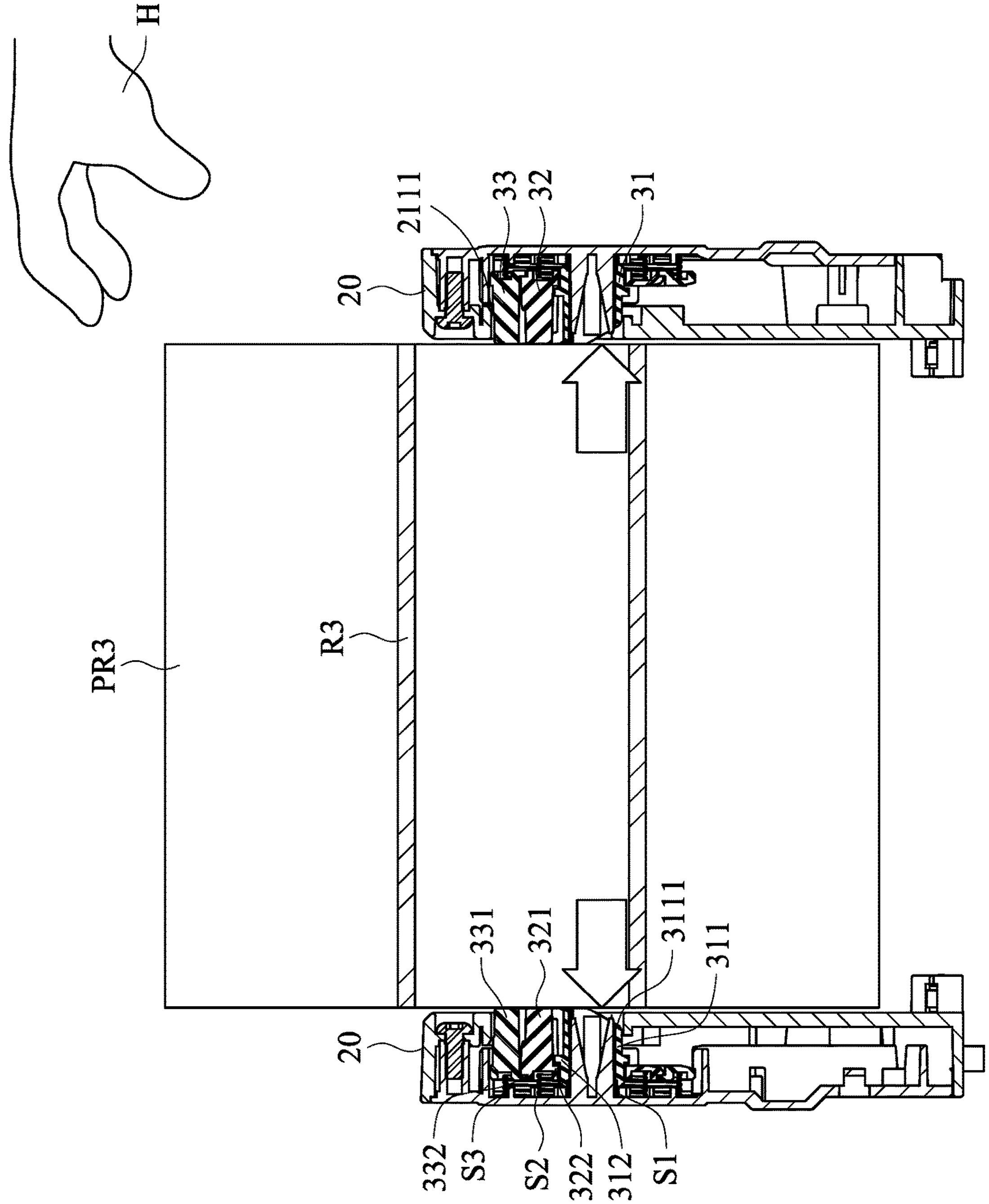
FIG. 6 is a schematic cross-sectional view illustrating the action of removing the paper roll through the supporting mechanism of the paper roll carrying device according to the embodiment of the present invention.

FIG. 6 is a schematic cross-sectional view illustrating the action of removing the paper roll through the supporting mechanism of the paper roll carrying device according to the embodiment of the present invention. Hereinafter, a process of removing the paper roll PR3 through the supporting mechanism 30 will be illustrated with reference to FIG. 5C and FIG. 6.

When a user H intends to remove the paper roll PR3, the two ends of the paper core R3 are moved along the first take-out slant surfaces 3111, the second take-out slant surfaces 3211 and the third take-out slant surfaces 3311 (see FIG. 3) to push the first arc-shaped support parts 311, the second arc-shaped support parts 321 and the third arc-shaped support parts 331. Consequently, the first arc-shaped support parts 311, the second arc-shaped support parts 321 and the third arc-shaped support parts 331 are simultaneously retracted into the corresponding paper clamping arms 20. In other words, the user H can remove the paper roll PR3 for replacement without the need of releasing the paper clamping arms 20.

In case that the paper roll PR1 is placed into the region between the two paper clamping arms 20 (e.g., in the situation of FIG. 5A), the process of removing the paper roll PR1 is similar. When the user H intends to remove the paper roll PR1, the two ends of the paper core R1 are moved along the first take-out slant surfaces 3111 (see FIG. 3) to push the first arc-shaped support parts 311. While the first arc-shaped support part 311 is pushed, the second stopping part 322 of the second support member 32 is pressed by the first stopping part 312 of the first support member 31, and the third stopping part 332 of the third support member 33 is pressed by the second stopping part 322 of the second support member 32. Consequently, the first arc-shaped support parts 311, the second arc-shaped support parts 321 and the third arc-shaped support parts 331 are simultaneously retracted into the corresponding paper clamping arms 20. In other words, the user H can remove the paper roll PR1 for replacement without the need of releasing the paper clamping arms 20.

In case that the paper roll PR2 is placed into the region between the two paper clamping arms 20 (e.g., in the situation of FIG. 5B), the process of removing the paper roll PR2 is similar. When the user H intends to remove the paper roll PR2, the two ends of the paper core R2 are moved along the first take-out slant surfaces 3111 (see FIG. 3) and the second take-out slant surfaces 3211 to push the first arc-shaped support parts 311 and the second arc-shaped support parts 321. While the first arc-shaped support parts 311 and the second arc-shaped support part 321 are pushed, the second stopping part 322 of the second support member 32 is pressed by the first stopping part 312 of the first support member 31, and the third stopping part 332 of the third support member 33 is pressed by the second stopping part 322 of the second support member 32. Consequently, the first arc-shaped support parts 311, the second arc-shaped support parts 321 and the third arc-shaped support parts 331 are simultaneously retracted into the corresponding paper clamping arms 20. In other words, the user H can remove the paper roll PR2 for replacement without the need of releasing the paper clamping arms 20.

From the above descriptions, the present invention provides a paper roll carrying device for a thermal printer or a thermal label machine. The paper roll carrying device is equipped with movable-type paper clamping arms for clamping paper rolls with different widths. Furthermore, the supporting mechanism comprises a first support member, a second support member and a third support member. The supporting mechanism can be used to support paper cores with different diameters of about 0.5 inch to 1.5 inch. When the user intends to place the paper roll and install the paper roll, it is not necessary to install additional accessories on the paper roll. The supporting mechanism is specially designed to have the take-out slant surfaces. The take-out slant surfaces are helpful for removing the paper roll. When the user intends to remove the paper roll, the user can quickly and conveniently replace the paper roll without the need of releasing the left paper clamping arm and the right paper clamping arm. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A paper roll carrying device, comprising:

two paper clamping arms opposed to each other, wherein a paper roll is clamped by the two paper clamping arms, and the paper roll has a paper core;

two supporting mechanisms respectively installed on corresponding positions of the two paper clamping arms and arranged at a same side of the two paper clamping arms, wherein the paper core is supported by the two supporting mechanisms, and each of the two supporting mechanisms comprises a first support member, a second support member and a third support member, wherein the first support member comprises a first arc-shaped support part and a first stopping part, the second support member comprises a second arc-shaped support part and a second stopping part, the second arc-shaped support part is located beside and arranged around the first arc-shaped support part, the first stopping part and the second stopping part are contacted with each other, the third support member comprises a third arc-shaped support part and a third stopping part, the third arc-shaped support part is located beside and arranged around the second arc-shaped support part, and the second stopping part and the third stopping part are contacted with each other; and two elastic modules respectively disposed within the two paper clamping arms to provide elastic forces to the corresponding supporting mechanisms, wherein while the first arc-shaped support part in one of the two supporting mechanisms is pushed, the corresponding second stopping part is pressed by the corresponding first stopping part, and the corresponding third stopping part is pressed by the corresponding second stopping part, so that the corresponding first arc-shaped support part, the corresponding second arc-shaped support part and the corresponding third arc-shaped support part are simultaneously retracted into the corresponding paper clamping arm.

2. The paper roll carrying device according to claim 1, wherein in each of the two supporting mechanisms, the first arc-shaped support part has a first take-out slant surface, the second arc-shaped support part has a second take-out slant surface, and the third arc-shaped support part has a third take-out slant surface.

3. The paper roll carrying device according to claim 2, wherein when the first arc-shaped support parts of the two supporting mechanisms are inserted into a tube of the paper core and contacted with an inner wall of the tube of the paper core, the second arc-shaped support parts are respectively pushed by two ends of the paper core, and the third stopping parts are pressed by the corresponding second stopping parts, so that the second arc-shaped support parts and the third arc-shaped support parts are simultaneously retracted into the corresponding paper clamping arms and the third arc-shaped support parts and the paper roll are not interfered with each other.

4. The paper roll carrying device according to claim 3, wherein while the paper roll is removed, the two ends of the paper core are moved along the corresponding first take-out slant surfaces to push the corresponding first arc-shaped support parts, so that the first arc-shaped support parts, the second arc-shaped support parts and the third arc-shaped support parts are simultaneously retracted into the corresponding paper clamping arms.

5. The paper roll carrying device according to claim 2, wherein when the first arc-shaped support parts and the second arc-shaped support parts of the two supporting mechanisms are inserted into a tube of the paper core, the second arc-shaped support parts are contacted with an inner wall of the tube of the paper core, and the third arc-shaped support parts are respectively pushed by the two ends of the paper core, so that the third arc-shaped support parts are retracted into the corresponding paper clamping arms.

6. The paper roll carrying device according to claim 5, wherein while the paper roll is removed, the two ends of the paper core are moved along the first take-out slant surfaces and the second take-out slant surfaces to push the corresponding first arc-shaped support parts and the corresponding second arc-shaped support parts, so that the first arc-shaped support parts, the second arc-shaped support parts and the third arc-shaped support parts are simultaneously retracted into the corresponding paper clamping arms.

7. The paper roll carrying device according to claim 2, wherein when the first arc-shaped support parts, the second arc-shaped support parts and the third arc-shaped support parts of the two supporting mechanisms are inserted into a tube of the paper core, the third arc-shaped support parts are contacted with an inner wall of the tube of the paper core.

8. The paper roll carrying device according to claim 7, wherein while the paper roll is removed, the two ends of the paper core are moved along the first take-out slant surfaces, the second take-out slant surfaces and the corresponding third take-out slant surfaces to push the corresponding first arc-shaped support parts, the corresponding second arc-shaped support parts and the corresponding third arc-shaped support parts, so that the first arc-shaped support parts, the second arc-shaped support parts and the third arc-shaped support parts are simultaneously retracted into the corresponding paper clamping arms.

9. The paper roll carrying device according to claim 1, wherein each of the two elastic modules comprises a first elastic element, a second elastic element and a third elastic element, wherein in each of the two supporting mechanisms, the first arc-shaped support part, the second arc-shaped support part and the third arc-shaped support part are respectively located at first ends of the first support member, the second support member and the third support member, and the first elastic element, the second elastic element and the third elastic element are respectively contacted with second ends of the first support member, the second support member and the third support member, wherein the first ends and the corresponding second ends are opposed to each other.

10. The paper roll carrying device according to claim 1, wherein the paper roll carrying device further comprises a base housing, the base housing comprises a paper roll accommodation space, and the two paper clamping arms are disposed within the paper roll accommodation space.

11. The paper roll carrying device according to claim 10, wherein at least one sliding recess is formed in a bottom side of the paper roll accommodation space, and at least one of the two paper clamping arms comprises at least one sliding block, wherein the at least one sliding block is slidably embedded within the at least one sliding recess, so that one of the two paper clamping arms is movable in a direction facing the other paper clamping arm.

12. The paper roll carrying device according to claim 11, wherein the at least one sliding block is temporarily fixed in the at least one sliding recess, so that a width of the paper roll clamped by the two paper clamping arms is changeable.

* * * * *